United States Patent [19]

Daguet et al.

[11] Patent Number: 5,315,682
[45] Date of Patent: May 24, 1994

[54] SPLICE DEVICE FOR SPLICING TOGETHER UNDER-SEA OPTICAL CABLES

[75] Inventors: Bruno Daguet; Géry Marlier, both of Calais, France

[73] Assignee: Alcatel Cable, Clichy Cedex, France

[21] Appl. No.: 89,548

[22] Filed: Jul. 12, 1993

[30] Foreign Application Priority Data

Jul. 16, 1992 [FR] France .................... 92 08799
Feb. 1, 1993 [FR] France .................... 93 01032

[51] Int. Cl.⁵ ............................................ G02B 6/38
[52] U.S. Cl. ............................. 385/95; 385/86; 385/107
[58] Field of Search ..................... 385/95-115, 385/86, 87, 69

[56] References Cited

U.S. PATENT DOCUMENTS

| | | | |
|---|---|---|---|
| 4,427,262 | 1/1984 | Oldham .................. | 385/99 X |
| 4,657,343 | 4/1987 | Oldham et al. ........ | 385/69 |
| 4,744,622 | 5/1988 | Cherry .................. | 385/87 |
| 5,037,177 | 8/1991 | Brown et al. .......... | 385/100 X |

FOREIGN PATENT DOCUMENTS

| | | |
|---|---|---|
| 0408244A3 | 1/1991 | European Pat. Off. . |
| 0493796A1 | 7/1992 | European Pat. Off. . |
| 3637812A1 | 5/1988 | Fed. Rep. of Germany . |
| 2030723A | 4/1980 | United Kingdom . |

*Primary Examiner*—John D. Lee
*Assistant Examiner*—Phan Thi Heartney
*Attorney, Agent, or Firm*—Sughrue, Mion, Zinn, Macpeak & Seas

[57] ABSTRACT

The splice device for splicing together two under-sea cables, each of which has a bundle of optical fibers protected inside a protective tube and armoring wires stranded on an inner sheath covering the protective tube, includes a strong support mounted on the protective tubes for protecting the two bundles of fibers, which bundles are welded together. In the splice device the support is locked on the protective tubes between the inner sheaths of the cables, and it receives firstly the end portions of the armoring wires, tensioned longitudinally in one layer on its periphery, and secondly an outer metal sleeve crimped on said support and on the armoring wires between the support and the sleeve.

17 Claims, 6 Drawing Sheets

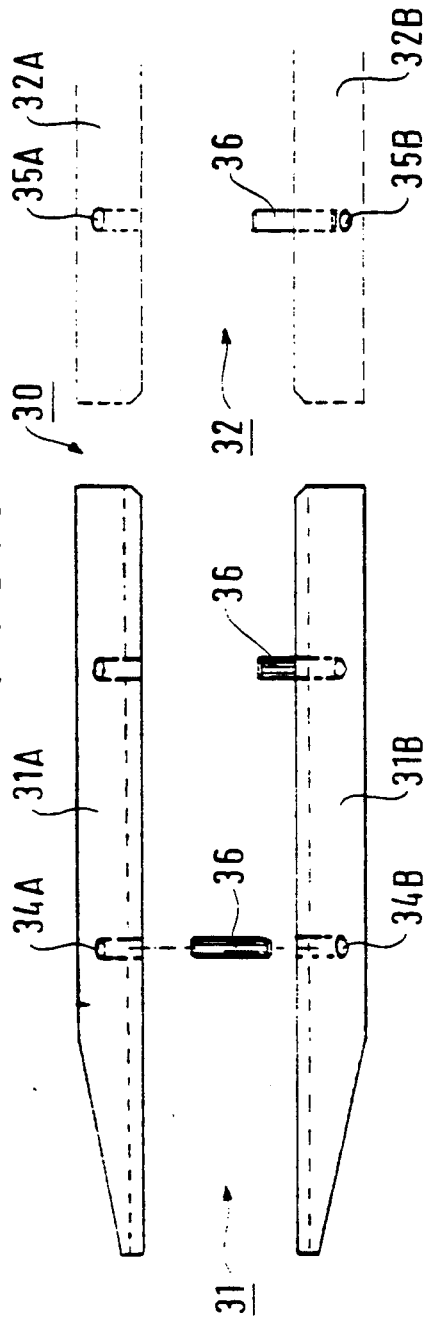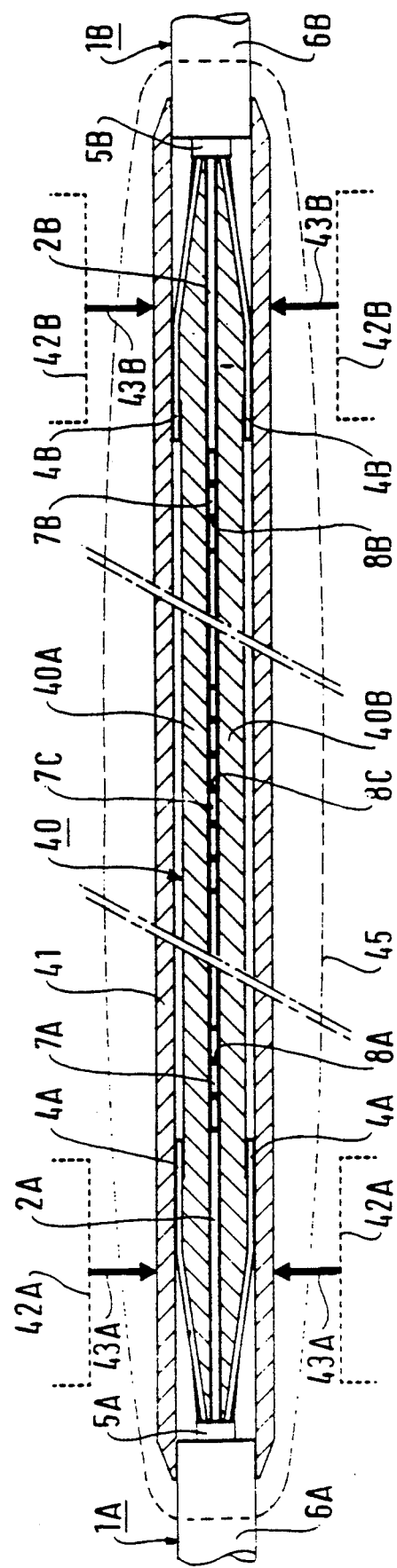

SPLICE DEVICE FOR SPLICING TOGETHER UNDER-SEA OPTICAL CABLES

The present invention relates to splice devices for splicing together under-sea optical cables, such devices being used for connecting together two cables or for repairing a damaged cable whose portions on either side of the damaged region are equivalent to two cables to be connected together.

BACKGROUND OF THE INVENTION

Such an under-sea optical cable has a central optical module and strength armoring surrounding the optical module. The optical module is formed by a bundle of optical fibers disposed freely inside a metal protective tube covered with an insulating sheath referred to as the "cable inner sheath." The protective tube is made of stainless steel, in particular. The inner sheath is made of polyethylene. The armoring wires are preferably disposed in at least two layers around the optical module. They give the cable suitable mechanical resistance to traction, and optionally they form a pressure-resisting vault. They are commonly covered with a conductive strip, generally made of copper, wound or welded lengthwise, which strip is used for electrically powering equipment such as repeater-regenerators interposed on the optical link defined by the set of interconnected cables. A protective outer sheath covers each cable.

For the purposes of connecting together two such cables, the component parts of the cables are separated from one another along the end portions to be connected together. In this way, the protective tubes for protecting the bundles of fibers and the inner sheaths are cut at different lengths from the ends so as to leave the bundles of fibers projecting from the protective tubes. The bundles of fibers are also left projecting to a greater or lesser extent relative to the ends of the inner sheaths. The armoring wires are not cut, or they are cut only over a short length, but they are unstranded over a length that is sufficient for the optical modules to be connected together. The conductive strips are cut over the length of the unstranded armoring wires. The outer sheaths are also cut, leaving the conductive strips to project slightly therefrom.

In most of the splice devices currently made, the two bundles of fibers of the two cables are spliced together by using a monofiber splicing technique. That technique entails leaving each fiber of each bundle to project over a considerable length, and storing the surplus lengths of the two bundles of fibers in the splice device, which is thus rendered relatively complex and bulky.

Compared with the preceding technique, the multifiber welding technique now in use advantageously enables the two bundles of fibers to be spliced together in a single operation. This technique further requires only a short surplus length to be left on each bundle of fibers. The multifiber welding technique also enables a single auxiliary tube to be used for protecting the multifiber weld, the auxiliary tube extending between the protective tubes for protecting the bundles of fibers, and being secured to said protective tubes.

Document U.S. Pat. No. 5,076,657 describes a method and a structure for interconnecting optical fibers in metal protective tubes, using such an auxiliary tube welded to the ends of the metal protective tubes, so as to protect the fiber weld. That document also discloses that the auxiliary tube is put under elongation so that it extends from one protective tube to the other, and is then welded to said protective tubes, so as to prevent the protected fiber weld from being subjected to any subsequent traction forces that may degrade the optical transmission characteristics.

Putting the auxiliary tube under elongation is a lengthy operation and is difficult to monitor. It may further create weak points along the auxiliary tube or at the welds between the ends thereof and the ends of the protective tubes.

Document GB-A- 2 030 723 describes a splice between two optical cables whose optical fibers are disposed in protective tubes, with the protective tube in each cable being surrounded by one or more layers of armoring wires. In that document, the ends of the optical fibers of the two cables are welded together and are covered by a ferrule formed by two half-shells locked facing each other, the ferrule having threaded ends. The ends of the armoring wires are tensioned and clamped between conical parts received in the ends of the ferrule, and are locked thus by two end nuts screwed on the threaded ends of the ferrule.

OBJECTS AND SUMMARY OF THE INVENTION

An object of the present invention is to provide a splice device for splicing together two under-sea optical cables, the device being simpler in structure and being easier and quicker to assemble, in which device the armoring wires of the two cables are integrated into the splice device so that they can be interconnected and so that the desired mechanical strength can be obtained at the device, without using conical clamping parts, installation of which takes a relatively long time.

The present invention provides a splice device for splicing together two under-sea optical cables, each of the cables including a bundle of optical fibers inside a protective tube covered with a protective "inner" sheath, armoring wires which are stranded to form at least one layer on said inner sheath, and a protective "outer" sheath covering the armoring wires, the cables having their component parts separated from one another over those of their end portions which are to be interconnected, said splice device including a multifiber weld between the bundles of fibers of the cables, which fibers are left to project from their respective protective tubes, a metal support extending between the protective tubes and over the end portions of said protective tubes, and receiving the end portions of the armoring wires on its periphery, longitudinal locking means for longitudinally locking the support relative to the protective tubes, and pressure radial clamping means for pressure clamping the armoring wires radially on the support, wherein said support has an outside diameter greater than the outside diameter of the inner sheaths of the cables, is mounted so that it abuts between the inner sheaths of the cables, which inner sheaths constitute said longitudinal locking means, and receives the end portions of the armoring wires longitudinally tensioned and disposed in a single layer on its periphery, and wherein said radial clamping means are constituted by an outer metal sleeve mounted and crimped on said support and on the armoring wires between the support and the sleeve.

The splice device advantageously further has at least one of the following additional characteristics:

said inner support extends substantially from the inner sheath of one of the cables to the inner sheath of the other cable, is constituted by a single support or by a plurality of independent supports, which are then mounted end-to-end, and is formed of longitudinal half-shells that are centered relative to each other on the protective tubes;

said inner support further includes catching members for catching said support on said protective tubes, which members contribute to longitudinally locking said support on said protective tubes, each of said catching members being constituted by a friction covering carried by the support and projecting into the bore of the support and/or provided on the protective tubes; and the splice includes additional means for applying tension to the armoring wires that are already held by said clamping means.

BRIEF DESCRIPTION OF THE DRAWINGS

The characteristics and advantages of the present invention will appear on reading the following description of embodiments given with reference to the accompanying drawings, in which:

FIG. 2A is a view of the inner support partly in cross-section and partly end-on;

FIG. 5 is a fragmentary view corresponding to FIG. 2 for a variant embodiment of said inner support;

FIG. 6 is a view corresponding to FIG. 1 and showing a variant embodiment of the splice device of the invention;

MORE DETAILED DESCRIPTION

Figure 1:
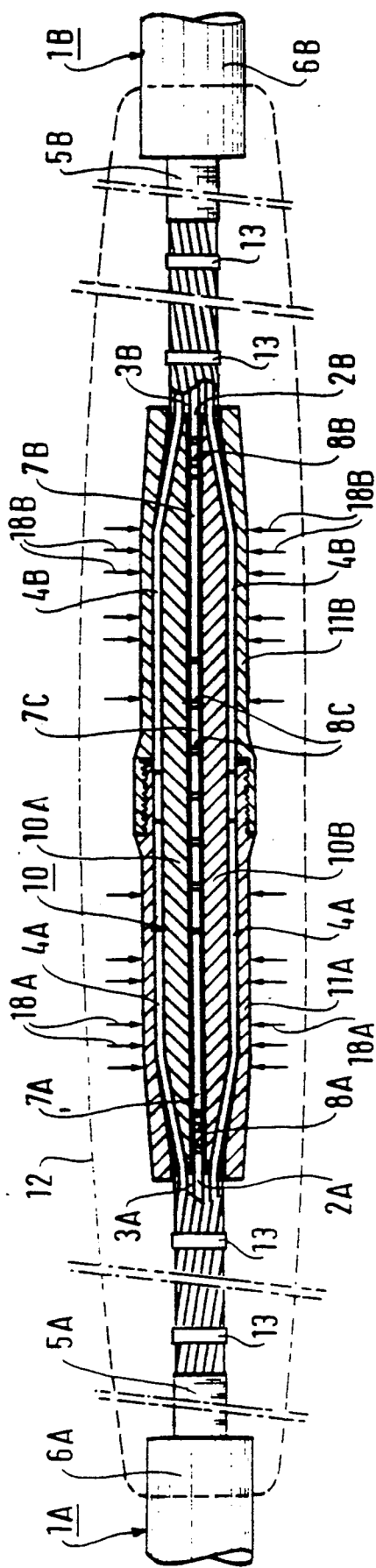
FIG. 1 shows a splice device of the invention partly in longitudinal section.

Before describing the splice device of the invention and the embodiments shown in the drawings, an indication is given below of the structure of each of the two under-sea optical cables to be connected together (or of the damaged under-sea optical cable whose two portions to be connected together are equivalent to two cables and are considered and referred to as such below). The description also relates to how their respective optical fibers are interconnected and how they are protected at said connection.

Figure 7:
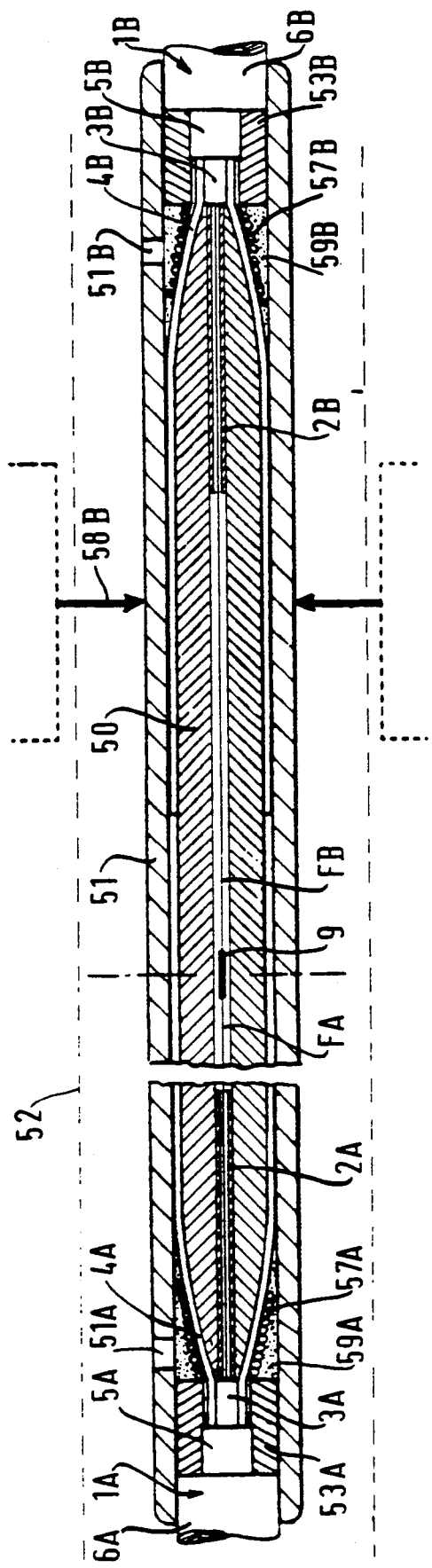
FIG. 7 is a view partly in axial section of another variant embodiment of the splice device of the invention.

FIGS. 1, 6, and 7 show the two cables 1A, 1B. Each of the cables includes a central metal tube 2A, 2B containing a bundle of optical fibers, which bundle is not shown or is merely represented by the reference FA or FB (FIG. 7). An inner sheath 3A, 3B covers the central tube and renders the diameter of the covered tube suitable for stranding strength armoring thereon. The strength armoring of each cable is formed of strong metal wires 4A, 4B, in particular made of steel, wound in one or preferably in at least two layers on the inner sheath. The armoring wires render the cable sufficiently resistant to traction, and optionally form a pressure-resisting vault. A conductive strip 5A, 5B, in particular made of copper, covers the armoring stranded on the inner sheath and delimits therewith a composite electrical conductor for powering equipment, such as repeaters. An outer sheath 6A, 6B covers the composite conductor. The outer sheath protects the cable and electrically insulates it.

For the purposes of connecting together the two cables, their component parts are separated from one another. On each prepared end, and by means of appropriate cutting, the conductive strip is left projecting slightly from the end of the outer sheath and is set back slightly relative to the inner sheath, with the armoring wires being unstranded and projecting considerably relative to the end of the inner sheath, and the bundle of fibers is left to project over a relatively long length from the protective tube which itself projects considerably from the end of the inner sheath. The unstranded armoring wires project relative to the protective tube but over a shorter length than the optical fibers.

The optical fibers in the two bundles from the two cables are connected together by using the now well-tried technique of multifiber welding.

The multifiber weld is not shown in the drawings. It is merely indicated that it is performed on a welding bench mounted on the end portions of the optical modules of the two cables after the armoring wires have been unstranded back to the ends of their respective cut conductive strips. The welding bench holds the end portions of the optical modules and holds the fibers of the two bundles projecting from their respective protective tubes so that the fibers remain end-to-end during the multifiber welding operation.

The weld is optionally strengthened by a resin coating. In FIGS. 1 and 6, the weld is protected by an auxiliary metal tube, given the overall numerical reference 7, covering the weld and providing continuity with the protective tubes for protecting the bundles of fibers of the cables, or, in FIG. 7, the weld is protected by a capillary tube covering the weld, as represented by the overall reference 9, before performing the splice proper between the two cables 1A and 1B.

In FIGS. 1 and 6, the weld is protected by two segments of auxiliary tube 7A, 7B which have respective ones of their ends secured to the ends of the tubes 2A, 2B, and which are themselves coupled together via a third segment of tube 7C secured to their other ends. The two segments 7A, 7B take the place of a single auxiliary tube substantially twice as long as each segment. Before the bundles of fibers are welded together, the two segments are threaded to some extent into the respective protective tubes or, in a variant, onto said protective tubes. The coupling third segment 7C may itself be threaded onto either one of the two segments 7A, 7B prior to said welding, but is preferably split lengthwise and positioned directly on the two segments 7A, 7B, which are already in position on the weld, and is then closed over its length.

Segments 7A, 7B are secured to the protective tubes 2A, 2B, in particular by crimping, as represented at 8A and 8B on their overlapping ends, and segment 7C is secured to segments 7A, 7B, in particular by crimping, as represented at 8C, crimping the tubes being preferred to welding them. The segments of auxiliary tube and the protective tubes are secured together without the segments of auxiliary tube being subjected to any traction.

In the splice device, the auxiliary tube formed by one or more segments of auxiliary tube then provides traction resistance and pressure resistance for the interconnected cables, whereas the single capillary tube does not perform this function.

In the embodiment shown in FIG. 1, the splice device further includes a strong metal tubular support 10 which is mounted on the protective tubes 2A, 2B, and over the segments 7A and 7C, which extends from one inner sheath 3A to the other 3B, and which receives the armoring wires 4A, 4B of the cables on its periphery. The support also has an outer metal sleeve 11 mounted on the support 10 and locking the armoring wires thereon. Overmolding 12 represented by dashed lines covers the sleeve 11, the armoring wires left bare and restranded on the inner sheath at either end of the sleeve, and the ends of the outer sheaths 6A, 6B. The overmolding provides continuity in the outer protection between the outer sheaths.

In this embodiment, the armoring wires 4A, 4B, initially unstranded back to the cut conductive strip 5A, 5B, are restranded on the inner sheath 3A, 3B at either end of the support 10, and are then tensioned longitudinally in a single layer on the periphery of the support. Bands 13 or a binding tape hold the restranded wires.

Figure 2:
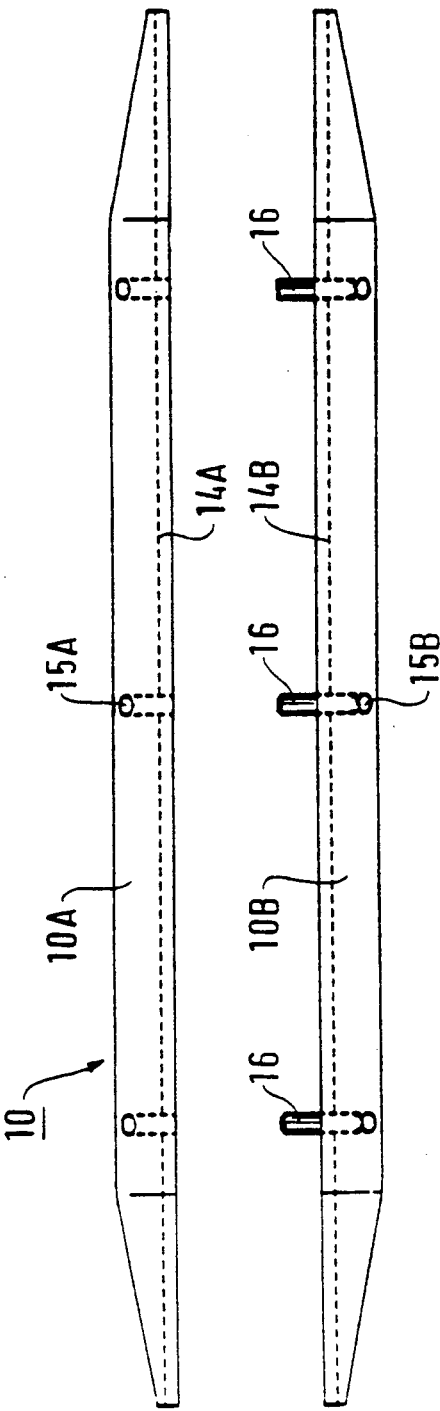
FIG. 2 is an exploded view of one of the parts of the splice device shown in FIG. 1, which part is referred to as the "inner support;"
Figure 2A:
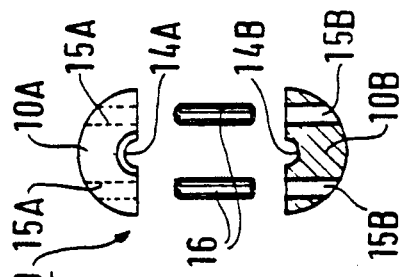

The support 10 is shown in detail in FIG. 1 or in FIGS. 2 and 2A. It is formed of two longitudinal half-shells 10A and 10B, that are identical and that have respective semi-cylindrical grooves 14A, 14B in their plane assembly faces. The two half-shells have respective sets of holes 15A, 15B opening out in and provided perpendicular to their plane assembly faces, the holes in each set being on either side of the respective grooves. Pegs 16 mounted in the sets of holes act as keying means and hold the two half-shells centered relative to each other around the protective tubes for protecting the fibers and the weld therebetween.

The support 10 is cylindrical and of outside diameter that is considerably greater than the outside diameter of the inner sheaths. Only the end portions of the support are frustoconical. Their outside diameters decrease so that at each end, they are substantially the same as the outside diameters of the inner sheaths. The inside diameter is uniform and is slightly greater than the outside diameter of the tubes 2A, 2B, and 7A to 7C.

Figure 3:
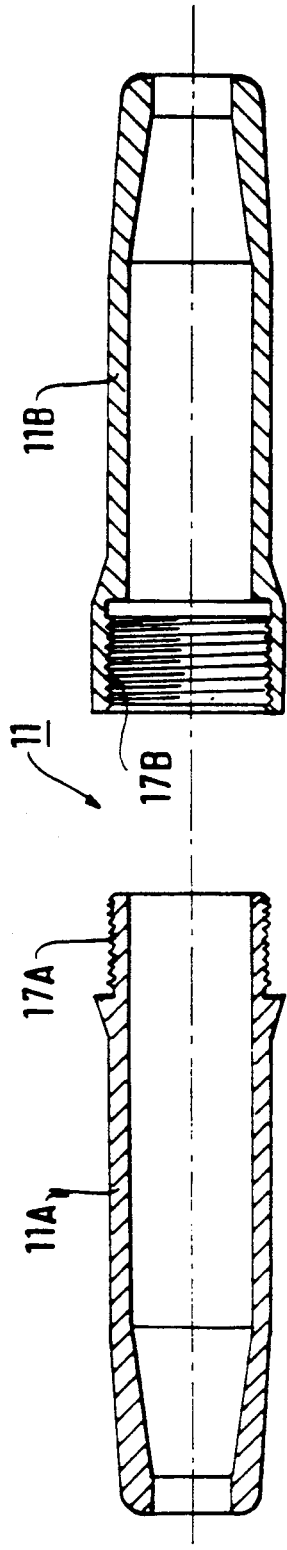
FIG. 3 is an exploded view in section showing another part of the splice, device shown in FIG. 1, which other part is referred to as the "sleeve;"

The sleeve 11 is shown in detail in FIG. 1 or in FIG. 3. It is formed of two half-sleeves 11A and 11B which are identical except for their assembly end portions, one of which is male 17A, and the other of which is female 17B. The male and female portions are respectively threaded and tapped so that they can be screwed together.

The sleeve has substantially the same length as the support. The inside diameter of the sleeve matches the outside diameter of the support which it covers so as to leave only that amount of clearance which is necessary to wedge the longitudinally-tensioned armoring wires 4A, 4B between the sleeve and the support. The other end portions (not the assembly end portions) are inwardly conical. The inside diameter of said other end portions remains slightly greater than the diameter of the layers of armoring wires stranded on the inner sheaths.

The two half-sleeves are initially threaded onto the cables before the fibers are welded and they are assembled together on the support and on the armoring wires tensioned on the periphery thereof. While the two half-sleeves are being assembled, they tension the restranded armoring wires towards one another. The sleeve is further crimped, as represented by arrows 18A, 18B on either side of its assembly ends 17A, 17B, on the sheet of armoring wires covering the support 10, so as to anchor said wires in the crimped sleeve.

Figure 4:
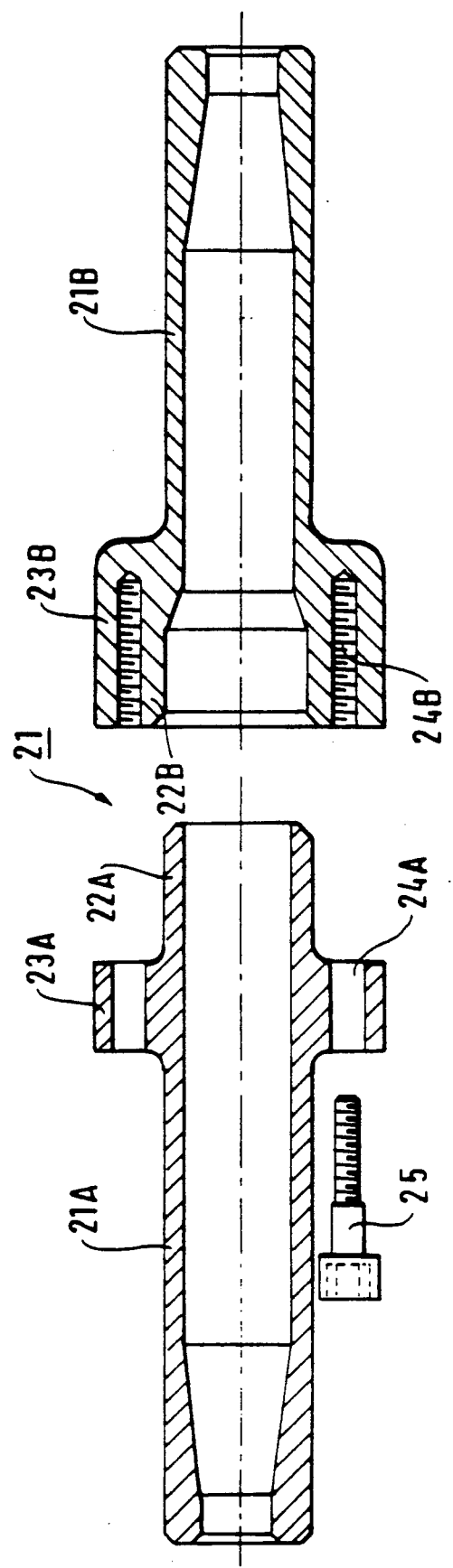
FIG. 4 is a view corresponding to FIG. 3 for a variant embodiment of said sleeve.

FIG. 4 shows a variant of the above-mentioned sleeve 11, the sleeve in this variant being designated by the reference 21.

Sleeve 21 is analogous to sleeve 11, except as regards the mode of assembling together the two half-sleeves 21A, 21B that make up the sleeve, and therefore of assembling together the male and female assembly end portions 22A, 22B.

The two assembly end portions 22A, 22B are a friction fit one in the other. The male portion 22A has a peripheral shoulder 23A not situated at its end and provided with an annular set of through holes 24A. The female portion 22B is extra thick and forms a peripheral shoulder 23B over its entire length relative to the body of the half-sleeve 21B. Peripheral shoulder 23B is provided with an annular set of tapped holes 24B that are open in its end face, which set corresponds to the set of holes 24A. The two half-sleeves 21A, 21B are assembled together by means of clamping screws 25 received in the sets of holes 24A, 24B.

With reference to FIG. 1, where sleeve 21 replaces sleeve 11, this mode of assembly locks the two half-sleeves 21A, 21B relative to each other in a first locking step so that their shoulders 23A and 23B leave a gap between them, as a result of a suitable choice for the length of the sleeve 21 as fully closed, which length is chosen to be slightly less than the length of the support. The first locking step is followed by crimping represented at 18A and 18B in FIG. 1. A second locking step is then performed by tightening the screws so as to tension the armoring wires and thereby take up any clearance in the restranded regions at either end of the sleeve 21.

FIG. 5 shows a variant embodiment of the above-mentioned support 10 shown in FIGS. 1 and 2, which variant embodiment may be used, in particular, when the sleeve of the splice device is of the type of the sleeve 21 shown in FIG. 4. The support in this variant is designated under the overall reference 30. It is analogous to support 10, but it is further split into two half-supports referenced 31 and 32, each of which is in turn constituted by two half-shells 31A, 31B and 32A, 32B. Two sets of holes 34A, 34B, 35A, 35B in the half-shells and pegs 36 provide centering therefor.

With reference to FIG. 1, it can be understood that the two half-supports are mounted in succession between the two inner sheaths 3A, 3B of the cables. A small amount of clearance may possibly be left between them.

With reference to FIG. 4, locking the assembled half-sleeves 21A, 21B together after they have been crimped on the half-supports simultaneously takes up the clearance between the two half supports, by taking up any clearance that may exist in the outer regions where the armoring wires have been restranded. In this way, the segments of auxiliary tube 7A, 7B, and 7C can be slightly compressed.

FIG. 6 shows a variant embodiment of the splice device shown in FIG. 1. This splice device also includes a strong metal tubular support 40 and a metal sleeve 41 covering the support and wedging the armoring wires on the support, and only the differences are indicated below.

Support 40, and sleeve 41 are referred to as "long" relative to support 10 and sleeve 11 corresponding to FIG. 1.

Sleeve 41 is further in one piece and has a uniform inside diameter that is just sufficient for it to slide over the outer sheath 6A or 6B of either one of the cables. Support 40 remains formed of two half-shells centered as described above by means of pegs.

In this embodiment shown in FIG. 6, each of the cables has its inner sheath cut substantially at the same level as the conductive strip 5A, 5B, and as a result said inner sheath is not visible. The free armoring wires at the end of the conductive strip 5A, 5B are positioned directly lengthwise in a single layer on the periphery of support 40. They are cut so as to extend over only a portion of the half-length of the support.

Sleeve 41, positioned on the support and over the armoring wires thereon, covers the ends of the outer sheaths 6A, 6B of the cables. It is crimped on the support 40 only in the almost-end regions, as represented by dashed lines 42A, 42B and arrows 43A, 43B.

Overmolding 45 coats the splice device and provides continuity in outer protection with the outer sheaths. In a variant, the sleeve has the middle portion of its body previously covered with an outer sheath, so that overmolding is performed only on either side of the sleeve so as to provide continuity in outer protection with the outer sheaths of the cables.

With reference to FIG. 7, the splice device includes a strong metal support 50 bored accurately relative to the diameter of the protective tubes and locked thereon, as explained below. Support 50 extends from one protective tube 2A to the other 2B and over the protective tubes to abut at either end against the ends of the inner sheaths 3A and 3B. The support is thick and its outside diameter is much greater than the outside diameter of the inner sheath. The end portions of the support are frustoconical, and their end diameters are reduced to the diameters of the inner sheaths. The support receives the unstranded armoring wires on its periphery, and they are restranded on it, the restranded wires being tensioned longitudinally and in a single layer.

The splice device further includes a metal sleeve 51 mounted on the support 50 and radially clamping the armoring wires restranded thereon, and final overmolding 52 represented by dashed lines, covering the sleeve 51 and extending from the outer sheath of one of the cables to the outer sheath of the other cable.

The splice device further includes, at each end, firstly a pressure-resistant band 53A, 53B, of the ring type, locking the armoring wires around the end of the inner sheath, the armoring wires being stranded in a plurality of layers and left bare by the conductive strip being set back, and a band 57A, 57B formed by metal serving wound and clamped helically around the armoring wires restranded on the end portion of the support 50, and secondly a resin plug 59A, 59B filling the empty space between the band of metal serving and the metal sleeve.

The metal sleeve 51 is in one piece and of inside diameter that is just sufficient for the sleeve to slide over the outside sheaths of the cables and over the armoring wires restranded lengthwise on the support 50. After it has been put in position extending from one outer sheath to the other, the sleeve is locked by being crimped at high pressure on the support, thereby clamping and locking the restranded armoring wires, as represented for one end only at 58B. Substantially at each of its ends, the sleeve has a hole 51A, 51B for injecting resin to form the above-mentioned plug 59A, 59B.

In the splice device implemented without an auxiliary tube for protecting the weld and the welded ends of the two bundles of optical fibers, the support 50 directly provides mechanical continuity between the protective tubes 2A, 2B.

Figure 8:
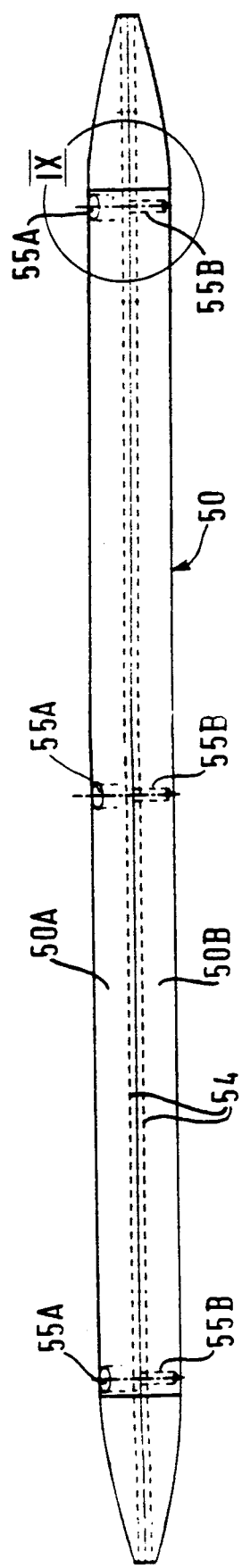
FIG. 8 is an elevation view of one of the members of the splice device shown in FIG. 7, which member is referred to as the "strong support;"
Figure 9:
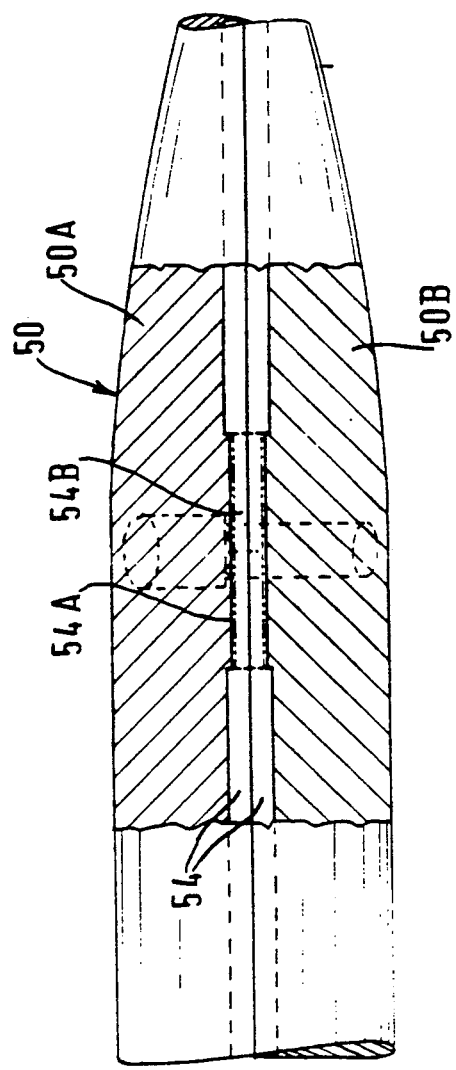
FIG. 9 is a view in section on an enlarged scale of the detail IX shown in FIG. 8.

Support 50 and the means for fully locking it on the protective tubes are described with reference to FIGS. 8 and 9.

Support 50 is formed of two longitudinal half-shells 50A and 50B, mutually identical and assemblable, each half-shell having a bore 54 of semi-circular cross-section. The half-shells are provided with sets of pairs of holes 55A, 55B by one of the half-shells being bored and the other half-shell being tapped simultaneously. The half-shells are assembled together by means of screws which are screwed into holes 55B and engaged and locked in holes 55A. The sets of holes are provided in the semi-cylindrical portion of each of the half-shells, and on either side of the bore. Three sets of holes are shown, one set being in the middle and the two others being almost at the ends of said semi-cylindrical portion.

For the purposes of locking the support 50 in position on the two protective tubes when assembling together the two half-shells making up the support, respective inwardly-projecting shoulder regions 54A covered with respective friction coverings 54B are provided, each shoulder region together with its friction covering forming a catching region for catching the support on the corresponding protective tube. The catching regions are close to the ends of the support, and are of calibrated inside diameter and of limited length. Each catching region is formed so as to extend on either side of the transition between the corresponding end portion of the support and the cylindrical portion thereof, and has one of the sets of pairs of holes 55A and 55B centered on itself. The friction covering 54B is thin and has a surface state that is rough or grainy with rigid particles. In particular, it is made of tungsten carbide.

Figure 10:
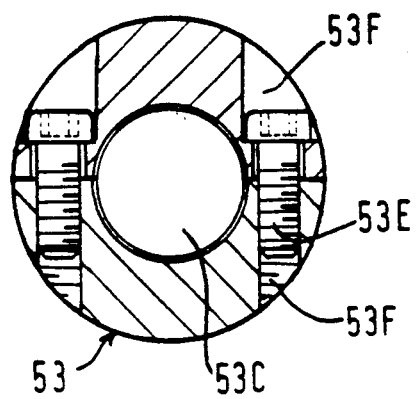
FIGS. 10 and 11 are respectively a view in cross-section and a view in axial section of another member, referred to as the "pressure-resisting band," of the splice device shown in FIG. 7.
Figure 11:
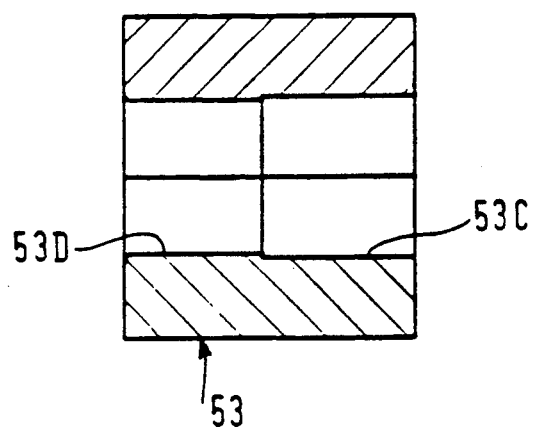

The pressure-resisting bands are described in more detail with reference to FIGS. 10 and 11, in which the pressure-resisting band shown is designated by the reference 53.

The pressure-resisting band is constituted by a ring preferably formed by two half-rings assembled together (not referenced separately). The ring has a bore 53C which has a slightly inwardly-projecting shoulder 53D at one end and over substantially half the length of the bore. The thickness of the shoulder corresponds to the thickness of the conductive strip 5A or 5B of each of the cables (FIG. 7).

The half-rings are assembled together around the respective conductive strips and around the pressure-resisting wires restranded on the end portions of the respective underlying inner sheaths. The two half-rings of each ring are assembled together in this way and locked by means of two screws 53E inserted in a pair of holes 53F provided in both of the half-rings on either side of their respective bores. The screws do not stand out proud from the ring.

During implementation of the splice device shown in FIG. 7, the resin plugs 59A, 59B are injected before the coating 52 is formed, and preferably also before the sleeve 51 is crimped on the support. The plugs secure the armoring wires to the binding serving so as to enable the assembly to offer better resistance to the traction forces exerted on the almost-finished splice, and subsequently on the splice device.

Since the sleeve 51 crimped on the support clamps the armoring wires tensioned thereon, the assembly can take up the traction forces fully, and it is possible to avoid any forces being applied to the bundles of optical fibers welded together.

In the embodiment shown in FIG. 7, the two catching regions for catching the support 50 on the protective tubes are provided directly on the support. This enables the regions to be made very accurately in the workshop. In a variant (not shown), it is nevertheless possible to make such catching regions on-site on the protective tubes rather than on the support, or else, more simply, to install a split or resilient friction ring between the support and each protective tube while the splice is being performed. Such a ring is thin, it locks the support longitudinally on the protective tubes, and it has a rough surface state both on its inside surface and on its outside surface.

It should also be noted that the splice device is of short length, and it directly provides continuity between the cut conductive strips, via its metal parts for providing armoring-wire continuity.

We claim:

1. A splice device for splicing together two under-sea optical cables, each of the cables including a bundle of optical fibers inside a protective tube covered with a protective "inner" sheath, armoring wires which are stranded to form at least one layer on said inner sheath, and a protective "outer" sheath covering the armoring wires, the cables having their component parts separated from one another over those of their end portions which are to be interconnected, said splice device including a multifiber weld between the bundles of fibers of the cables, which fibers are left to project from their respective protective tubes, a metal support extending between the protective tubes and over the end portions of said protective tubes, and receiving the end portions of the armoring wires on its periphery, longitudinal locking means for longitudinally locking the support relative to the protective tubes, and pressure radial clamping means for pressure clamping the armoring wires radially on the support, wherein said support has an outside diameter greater than the outside diameter of the inner sheaths of the cables, is mounted so that it abuts between the inner sheaths of the cables, which inner sheaths constitute said longitudinal locking means, and receives the end portions of the armoring wires longitudinally tensioned and disposed in a single layer on its periphery, and wherein said radial clamping means are constituted by an outer metal sleeve mounted and crimped on said support and on the armoring wires between the support and the sleeve.

2. A splice device according to claim 1, wherein said support is formed by two longitudinal half-shells, equipped with centering means for centering them on each other on the protective tubes and therebetween.

3. A splice device according to claim 1, wherein said support is formed by two independent half-supports mounted substantially end-to-end, each half-support being constituted by two longitudinal half-shells equipped with centering means for centering them on each other on the protective tubes.

4. A splice device according to claim 1, wherein said sleeve is formed by two half-sleeves slidably mounted on the armoring wires and having respective "male" and "female" interfittable assembly first end portions which fit together to assemble the sleeve, and respective abutment second end portions which abut against the end portions of said support.

5. A splice device according to claim 4, wherein the male and female portions of the two half-sleeves have respective threads so that they can be screwed together.

6. A splice device according to claim 4, wherein the male and female portions of said two half-sleeves can be slid together, the male portion being provided with a peripheral shoulder not situated at its end and provided with a first annular set of through holes, and the female portion being provided with a longitudinally-extending portion of extra thickness in which a second set of holes that are complementary to the first set are formed, the male and female portions being assembled together by means of locking screws, thereby applying additional tension to said armoring wires at either end of the two assembled half-sleeves.

7. A splice device according to claim 1, wherein said sleeve extends continuously between the respective end portions of the outer sheaths of the cables.

8. A splice device according to claim 1, further including two catching members for catching said support on said protective tubes, which members contribute to longitudinally locking said support on said protective tubes.

9. A splice device according to claim 8, wherein each of said catching members is constituted by a friction covering provided on the inside of said support and projecting into the bore of the support.

10. A splice device according to claim 9, wherein each of said catching members includes an inwardly-projecting shoulder region inside said bore of said support, which region is covered with said friction covering.

11. A splice device according to claim 9, wherein the covering is made of tungsten carbide.

12. A splice device according to claim 9, in which said support is formed of two half-shells equipped with centering means, wherein said centering means are means for clamp locking said half-shells to one another, which means are provided level with said catching members for catching said support on said protective tubes.

13. A splice device according to claim 9, and in which the end portions of said armoring wires, as restranded, are locked by means of bands, wherein a "pressure-resisting" one of said bands is constituted by a ring for locking the armoring wires on the end of each inner sheath.

14. A splice device according to claim 9, and in which the end portions of said armoring wires, as restranded, are locked by means of bands, wherein said bands comprise strong servings for locking the restranded armoring wires on each end of said support, and a resin plug provided on each serving to secure the serving to said armoring wires.

15. A splice device according to claim 14, wherein said sleeve is provided with two through holes via which said resin plug can be injected.

16. A splice device according to claim 8, wherein said catching members are constituted by a covering layer provided on said protective tubes.

17. A splice device according to claim 8, wherein said catching members are constituted by a ring having an inside friction covering and an outside friction covering, and mounted between each of said protective tubes and said support.

* * * * *